US005794000A

United States Patent [19]

Furuta

[11] Patent Number: 5,794,000
[45] Date of Patent: Aug. 11, 1998

[54] METHOD AND APPARATUS FOR AVOIDING ERRONEOUS ABORT OCCURRENCES IN PCI-BUS SYSTEMS

[75] Inventor: Shinichi Furuta, Tokyo, Japan

[73] Assignee: Kabushiki Kaisha Toshiba, Kawasaki, Japan

[21] Appl. No.: 707,962

[22] Filed: Aug. 30, 1996

[30] Foreign Application Priority Data

Sep. 8, 1995 [JP] Japan .................. 7-231618

[51] Int. Cl.⁶ ........................................ G06F 13/00
[52] U.S. Cl. ..................... 395/309; 395/306; 395/308
[58] Field of Search ........................... 395/309, 306, 395/308, 281, 882, 292, 300

[56] References Cited

U.S. PATENT DOCUMENTS

| 5,568,621 | 10/1996 | Wooten ........................... 395/292 |
| 5,621,900 | 4/1997 | Lane et al. ........................ 395/300 |
| 5,649,175 | 7/1997 | Kanekal et al. .................. 395/881 |

OTHER PUBLICATIONS

"Mobile PC/PCI DMA Arbitration and Protocols," Intel Corporation, Apr., 1996, Revision 2.2, pp. 1–27.
Intel Article, "Peripheral Components," pp. 3–33 through 3–50, (1993).
PCI Local Bus Specification, PCI Special Intrest Group, Revision 2.1 (1995).
PCI Local Bus Specification, PCI Special Intrest Group, Revision 2.0 (1995).

*Primary Examiner*—Ayaz R. Sheikh
*Assistant Examiner*—Ario Etienne
*Attorney, Agent, or Firm*—Finnegan, Henderson, Farabow, Garrett & Dunner, L.L.P.

[57] ABSTRACT

After a PCI device has commenced a transaction on an external PCI bus to access a PCI device on an internal PCI bus, an external PCI bus bridge implemented in a DS-PCI/ISA bridge device, connected to the internal PCI bus and the external PCI bus, activates a dummy device selection signal (DEVSEL#) on the external PCI bus in advance. This dummy DEVSEL# is automatically activated, without waiting for a response from the PCI device on internal PCI bus specified by the transaction. If external PCI bus bridge does not receive the response from the PCI device on the internal PCI bus, external PCI bus bridge activates a stop signal (STOP#) on the external PCI bus and the transaction is normally concluded.

17 Claims, 7 Drawing Sheets

5,794,000

1

METHOD AND APPARATUS FOR AVOIDING ERRONEOUS ABORT OCCURRENCES IN PCI-BUS SYSTEMS

FIELD OF THE INVENTION

This invention relates to computer systems, and, in particular, concerns a computer system with a bridge device to connect two PCI buses.

BACKGROUND OF THE INVENTION

Standard system buses, such as ISA (Industry Standard Architecture) and EISA (Extended ISA) buses, are conventionally used in personal computers. Another standard bus, PCI (Peripheral Component Interconnect) bus, is commonly employed in desktop-type personal computers to increase the speed of data transfer and organize system architecture, independently of the kind of processors. The PCI bus is described in "PCI Local Bus Specification" written by PCI Special Interest Group, Jun. 1, 1995, the content of which is hereby incorporated by reference. Substantially all data transfer using a PCI bus is block transfer, where each block is transferred by burst transmission. For example, data can be transferred at a maximum data transfer speed of 133 megabytes/sec. on a data bus having a width of 32 bits.

Therefore, when a PCI bus is used, data transfer between I/O devices and between a system memory and an I/O device is executed at high speed. As such, system performance is high.

FIG. 1 illustrates an example of a system structure of a conventional personal computer with a plurality of PCI buses.

As shown in FIG. 1, PCI devices (A and B) 63, 64 are connected to the bus closest to CPU 61, first PCI bus 82. First bridge device 65 connects first PCI bus 62 and second PCI bus 66. In this case, first PCI bus 82, which is positioned on the side closest to CPU 81, is known as a primary PCI bus of the first bridge device 65, while the second PCI bus 66, which is positioned on the side farthest from CPU 81 is known as a secondary PCI bus of the first bridge device 65.

PCI device (P) 67 is connected to second PCI bus 66. Second bridge device 68 connects second PCI bus 66 and third PCI bus 69. In this case, second PCI bus 66, which is positioned on the side closest to CPU 81, is known as a primary PCI bus of the bridge device 68, while third PCI bus 69, which is positioned on the side farthest from CPU 81, is known as a secondary PCI bus of bridge device 68. PCI devices (X, Y and Z) 70, 71 and 72 are each connected to third PCI bus 69. In the preferred embodiment, each of these three PCI buses 82, 66 and 69 are mutually asynchronous and have different operating frequencies.

Another function of the PCI bus is master abort. FIG. 2 shows the normal master abort timing, as defined by the PCI bus specification.

As shown in FIG. 2, a bus master begins a transaction by activating a frame signal FRAME # at CLK cycle 2. To begin, the bus master outputs an address to specify a target in address/data bus (AD) and a command to specify a transfer type in a command/byte enable line (C/BE#). Each PCI device refers to the address and command. A PCI device serving as a target activates a device selection signal line (DEVSEL#) to respond to the bus master, if the PCI device can process the command and the address falls within its address range.

In this case, the response timing of the DEVSEL# corresponds to CLK cycles 3, 4, 5, 6. That timing includes fast, slow, medium, and subtract.

2

The bus master samples DEVSEL# at the rising edge of CLK cycle 3, 4, 5, 6. If the DEVSEL# does not become active by the rising edge of the CLK cycle 6, the bus master determines that a corresponding target does not exist, and the bus master concludes the transaction. Thus, a master abort occurs.

Normally, when a PCI device serves as a target of a current transaction, that PCI device makes DEVSEL# active at any one of a fast, a slow, a medium, and a subtract timing. The master abort occurs only if the corresponding target does not exist. Thus, the master abort does not occur erroneously when a target exists.

However, in the computer system shown in FIG. 1, due to delays from synchronization and the transfer of the transaction executed by bridge devices 65, 68, the master abort occurs according to the timing shown in FIG. 3.

To begin, PCI device (Z) 72 commences operation as a bus master, and activates a frame signal (FRAME#) on third PCI bus 63 to execute the transaction to access PCI device (A) 63. The transmission of the transaction onto first PCI bus 62 is delayed by the synchronization of the first and second bridge devices 65, 68.

For instance, PCI device (A) 63, which is a target, activates DEVSEL#, according to the timing of slow. That timing is at CLK cycle 5 on first PCI bus 62. However, due to delays from synchronization, DEVSEL# is activated on third PCI bus 69 at CLK cycle 9 on third PCI bus 69, as shown in FIG. 3. Thus, PCI device (Z) is already in the state of master abort and normal data transfer cannot be executed.

In the transaction between two PCI buses that are mutually asynchronous and whose operating frequencies differ, such a master abort occurs erroneously.

SUMMARY OF THE INVENTION

One object of this invention is to prevent a master abort from occurring erroneously.

Another object of this invention is to provide a bridge device having quicker response timing to a bus master.

In accordance with the present invention, the foregoing objects, among others, are achieved by providing an apparatus for controlling a transaction on a PCI bus, the apparatus comprising a primary PCI bus; a secondary PCI bus being asynchronous with the primary PCI bus; a bridge device, connected to the primary PCI and secondary PCI buses, for transmitting a transaction between the primary PCI bus and the secondary PCI bus; bus master device, connected to either of the primary PCI bus or the secondary PCI bus, for commencing a transaction to access a target on the other PCI bus; and a device, coupled to the bridge device, for notifying the bus master that the target on the other PCI bus address-specified by the transaction has decoded the address of the transaction, without waiting for a actual response from the target.

There has been provided, in accordance with another aspect of the present invention, a method of controlling a transaction in a computer system having a primary PCI bus; a secondary PCI bus being in asynchronization with the primary PCI bus; and a bridge device for transmitting a transaction between the primary PCI bus and the secondary PCI bus. The method comprises the steps of commencing a transaction to access a target on another PCI bus by a bus master on either of the primary PCI bus or the secondary PCI bus, and notifying the bus master that the target has decoded the address of the transaction, without waiting for a response from a target address specified by the transaction.

In the computer system of this invention, the bridge device for connecting two PCI buses is mutually asynchronous and has different operating frequencies. Further, the bridging device has a mechanism for pseudo-making a device selection signal line (DEVSEL#) on the bus of a bus master active. This mechanism makes a device selection signal line (DEVSEL#) active in advance without waiting for a response from a PCI device specified by an address in a transaction. In this way, the response timing to a bus master is quickened. The generation of the master abort, which erroneously originates in the propagation delay through the bridge device, can be prevented.

In addition, in the computer system of this invention, if a device selection signal (DEVSEL#) on the PCI bus connected to a target is not activated by a target within a predetermined period after a transaction was commenced, a bridge device drives a stop signal line (STOP#) on the PCI bus connected to a bus master to complete the transaction and notifies the bus master, who began the transaction, of a target abort.

Moreover, in the computer system of this invention, after the bridge device pseudo-made a device selection signal (DEVSEL#) active to respond to the transaction, if a master abort is actually generated, the bus master that began the transaction is notified of a target abort by activating a stop signal line (STOP#). Hence, the transaction which is in advance pseudo-driven a device selection signal line (DEVSEL#) can be terminated. Even when a master abort actually occurs, the transaction can be normally terminated.

Other objects, features, and advantages of the present invention will become apparent from the following detailed description. It should be understood, however, that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
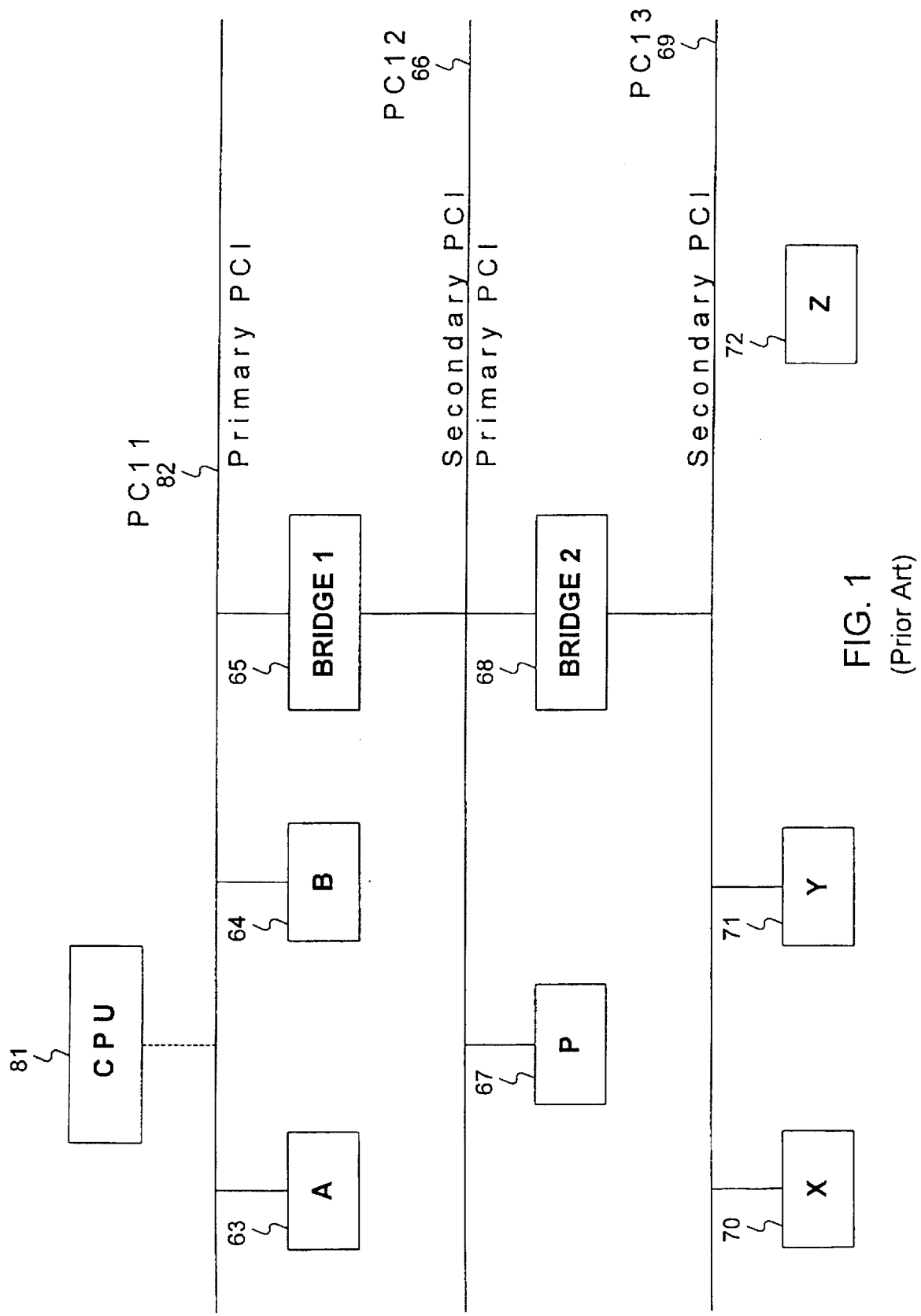
FIG. 1 is a block diagram showing the system configuration of a conventional personal computer with PCI buses.
Figure 2:
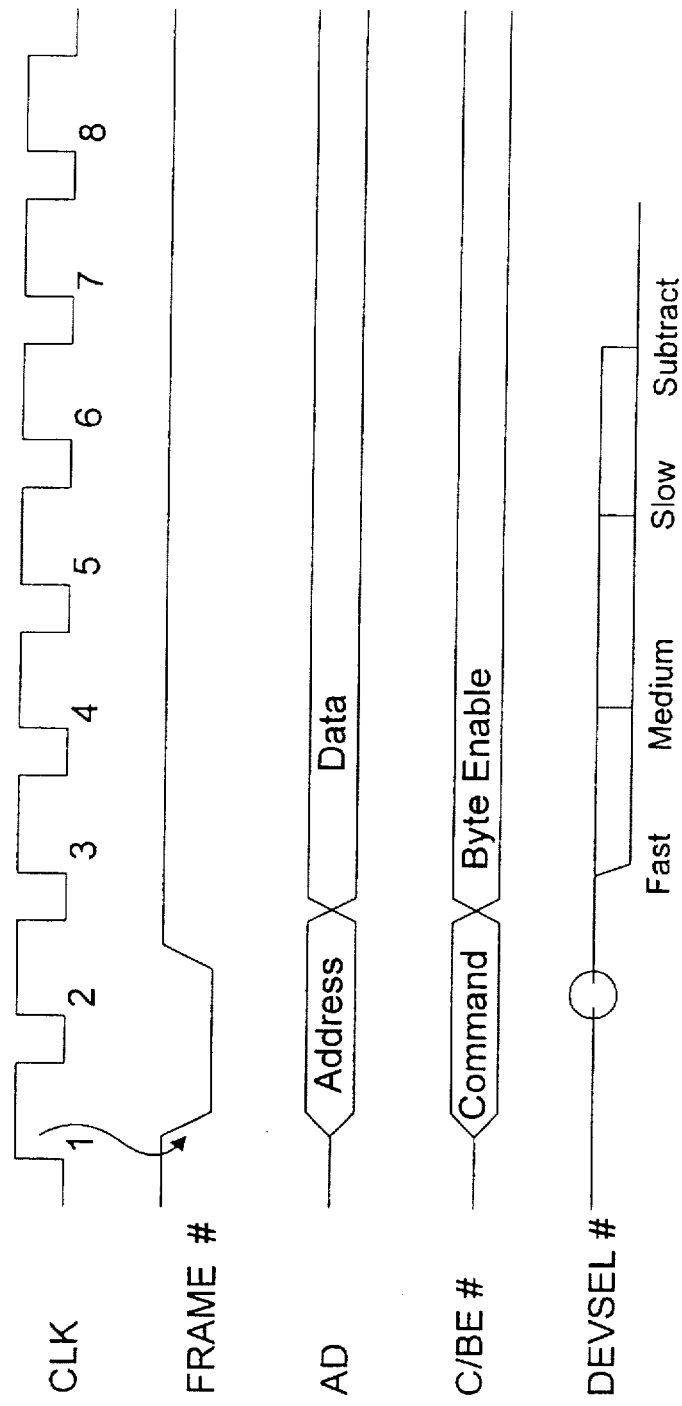
FIG. 2 is a timing chart showing the timing of the generation of a normal master abort regulated by the PCI specification.
Figure 3:
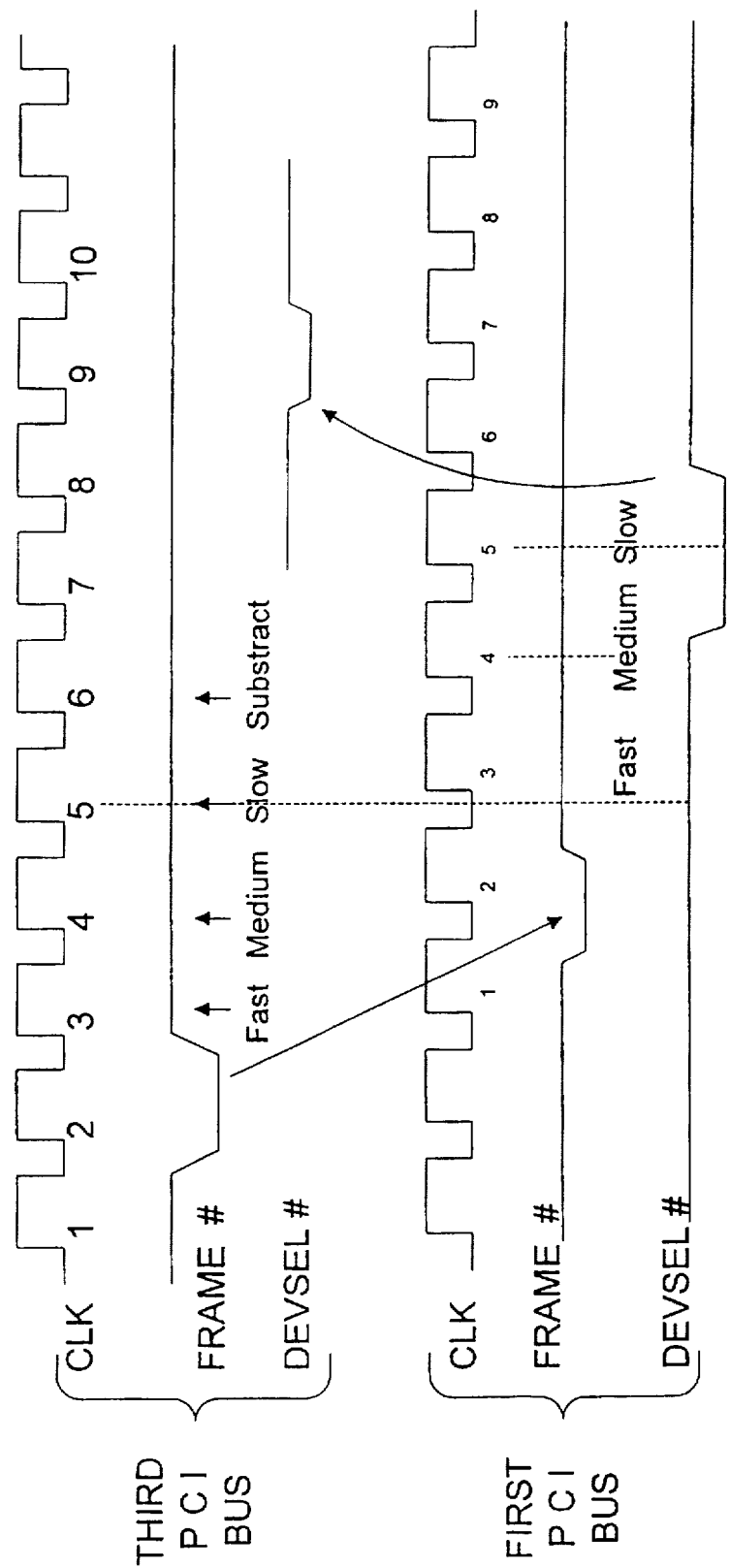
FIG. 3 is a timing chart showing a master abort generated due to propagation delay of a transaction in the computer system of FIG. 1.
Figure 4:
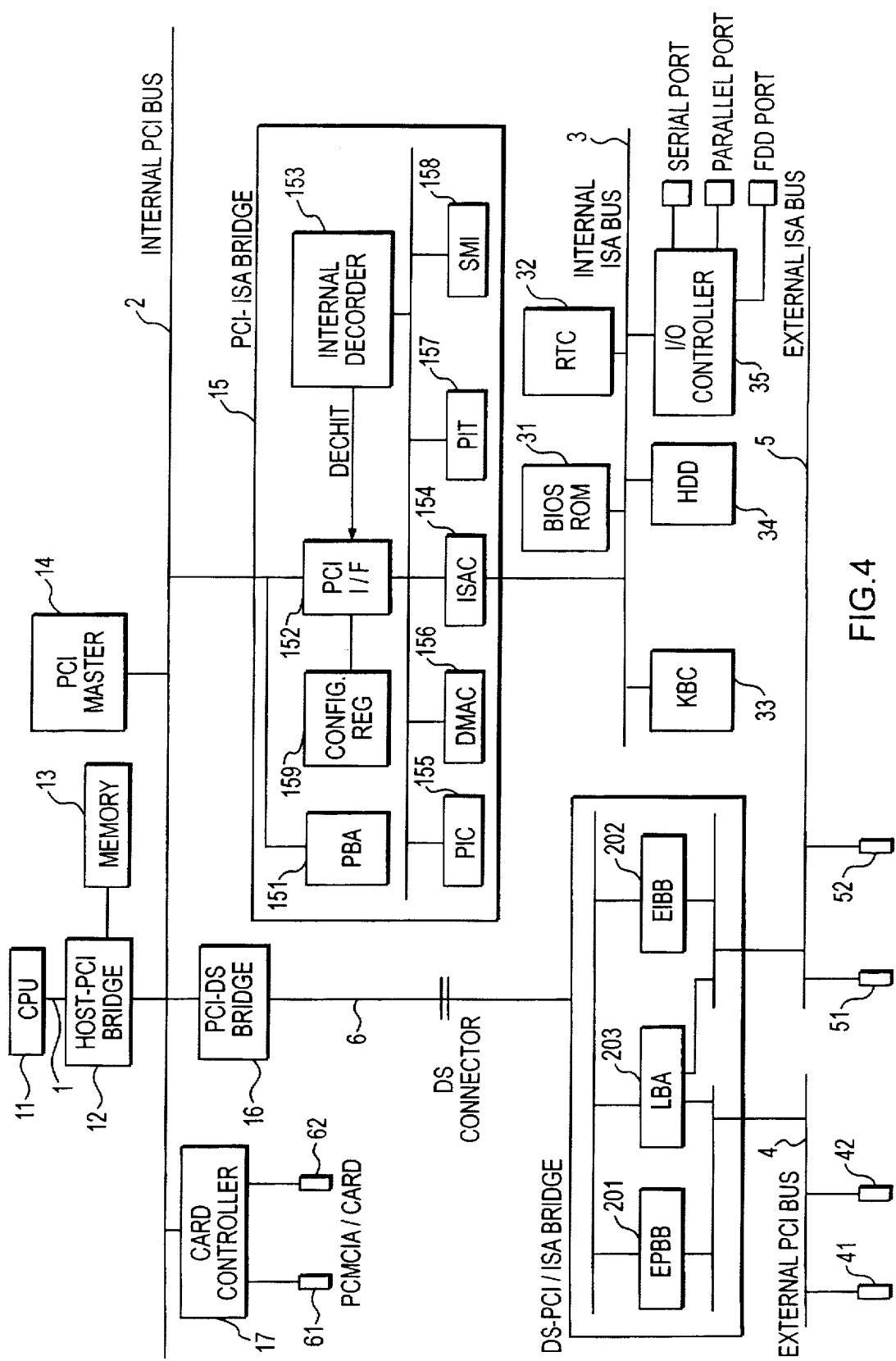
FIG. 4 is a block chart of a computer system in accordance with one embodiment of this invention.

FIG. 4 shows the structure of a computer system, in accordance with one embodiment of this invention. This computer system is preferably a notebook type or laptop type portable computer. As shown in FIG. 4, three types of buses, i.e. a processor bus 1, an internal PCI bus 2 and an internal ISA bus 3, are arranged on a system board. An external PCI bus 4 and an external ISA bus 5 are arranged in a desk station (expansion unit) connected to a DS connector of the portable personal computer.

The system board provides a CPU 11, a HOST-PCI bridge device 12, a system memory 13, various types of PCI master devices 14, an internal PCI-ISA bridge device 15, a PCI-DS (DS: desk station) bridge device 16, and a PC card controller 17. Also, the desk station can include DS-PCI/ISA bridge device 20; PCI expansion slots 41 and 42, in which PCI expansion cards are installable; and ISA expansion slots 51 and 52, in which ISA expansion cards are installable.

CPU 11 is preferably a "Pentium" microprocessor produced and marketed by the Intel Company. Processor bus 1 can be directly connected to input/output pins of CPU 11 and preferably has a 64-bit data bus.

System memory 13 is a memory device for storing an operating system, device drivers, application programs to be executed, and data for processing. Memory 13 is preferably formed by a plurality of DRAMs. System memory 13 is connected to host/PCI bridge device 12 via a memory bus having a 32-bit or 64-bit data bus. Processor bus 1 serves as a data bus for the memory bus. In such a case, the memory bus is formed by an address bus and various types of memory control signal lines.

Host-PCI bridge device 12 is a bridge LSI for coupling processor bus 1 and internal PCI bus 2, and functions as one bus master of a PCI bus. Host-PCI bridge device 12 can directionally convert bus cycles including data and addresses between processor bus 1 and internal PCI bus 2, and can control access of system memory 13 via a memory bus. Also, host-PCI bridge device 11 includes a buffer (not shown) for synchronizing the bus cycles of processor bus 1 and internal PCI bus 2.

Internal PCI bus 2 is a clock-synchronization type input/output bus. All cycles on internal PCI bus 2 are synchronized with a PCI bus clock. Clock speed of internal PCI bus 2 is preferably no greater than 33 MHz. Internal PCI bus 2 has an address/data bus used in a time division manner. This address/data bus has a width of 32 bits.

A data transfer cycle on internal PCI bus 2 is formed from an address phase and one or more data phases following thereafter. An address and transfer type are output in the address phase 8-bit, 16-bit, 24-bit or 32-bit data are output during the data phases.

Along with host-PCI bridge device 12, PCI master device 14 is one bus master of internal PCI bus 2 and operates as an initiator or target. In a preferred embodiment, PCI master device 14 is a graphics controller.

Internal PCI-ISA bridge device 15 is a bridge LSI for coupling internal PCI bus 2 and internal ISA bus 3. A BIOS ROM 31, a real time clock 32, a keyboard controller (KBC) 33, a HDD 34, and an I/O port controller 35 are connected to internal ISA bus 3.

Internal PCI-ISA bridge device 15 includes a PCI bus arbiter (PBA) 151, PCI interface (PCI I/F) 152, internal decoder 153, ISA controller (ISAC) 154, interrupt controller (PIC) 155, DMA controller (DMAC) 156, system timer (PIT) 157, SMA generating logic 158, and configuration register group (CONFIG.REG) 159.

PCI bus arbiter (PBA) 151 arbitrates bus accesses between all bus master devices connected to internal PCI bus 2. In this arbitration, signal lines (a bus request signal REQ# line and a grant signal GNT# line) on internal PCI bus 2 are allocated in one pair to each bus master device.

A bus request signal REQ# is a signal for notifying PCI bus arbiter (PBA) 151 of a request from a device to use internal PCI bus 2. A grant signal GNT# is a signal for notifying the device issuing the bus request signal REQ# that it has access to internal PCI bus 2.

Also, in this system, among the plurality of groups of REQ# and GNT# lines defined on internal PCI bus 2, one REQ# and GNT# line group allocated to DS-PCI/ISA bridge device 20 is used for a DMA serial channel protocol for transmission and reception of DREQs and DACK#s between DMA slaves connected to external ISA bus 5.

All of the bus request signal REQ# lines and grant signal GNT# lines on internal PCI bus 2 are connected to PCI bus arbiter (PBA) 151. Arbitration of bus access right on internal PCI bus 2 is controlled by PCI bus arbiter (PBA) 151.

PCI interface 152 transmits and receives addresses, data, commands and various status signals with internal PCI bus 2. A device select signal (DEVSEL#) is also included in the status signal, and when a decoder hit signal (DECHIT#) is generated from the internal decoder, PCI interface 152 activates the DEVSEL# and responds to the transaction of internal PCI bus 2.

The DEVSEL# is a signal for notifying the initiator which has initiated a transaction that PCI-ISA bridge device 15 has been selected as the target of the transaction executed on internal PCI bus 2. Decode logic incorporated in internal decoder 153 generates a DECHIT# signal in response to a hit signal.

Internal decoder 153 performs address decoding for selecting each of the devices implemented in PCI-ISA bridge device 15 (programmable interrupt controller 155, DMA controller 156, system timer 157, SMI generating logic 158 and configuration register group 159) and devices on internal ISA bus 3 (BIOS ROM 31, real time clock 32, keyboard controller 33, HDD 34, and I/O port controller 35). Also, internal decoder 153 decodes I/O addresses, memory addresses and configuration addresses outputted to internal PCI bus 2.

ISA controller 154 executes ISA bus cycles for accessing memory and I/O devices on internal ISA bus 3. Configuration register group 159 is a register group readable/writable in configuration cycles, and control information for controlling internal decoder 153 is set therein, when the power of the system is turned on.

PCI-DS bridge device 16 is a bridge LSI for connecting internal PCI bus 2 and a desk station bus 6 leading out to the desk station from the computer main body via the DS connector, and transmits bus cycles bi-directionally. Desk station bus 6 is one type of PCI bus which includes a signal line group corresponding to internal PCI bus 2. Desk station bus 6 is asynchronous with internal PCI bus 2 and its operating frequency differs from that of internal PCI bus 2. For example, the operating frequency of internal PCI bus 2, i.e. the clock frequency of internal PCI bus 2, preferably is in the order of 30 to 33 MHz, whereas the clock frequency of desk station bus 6 preferably is in the order of 20 to 25 MHz. In this way, the clock frequency of desk station bus 6 is lower than that of internal PCI bus 2 because, in contrast to internal PCI bus 2 implemented on the system board formed from a hard circuit board, desk station bus 6 is implemented on a flexible cable leading out from the system board to the DS connector. Normally, measures against high frequency noise are difficult in a flexible cable compared with a system board, hence it is preferable that the clock frequency be as low as possible.

Desk station bus 6 is the secondary PCI bus of PCI-DS bridge device 16, and internal PCI bus 2 is the primary PCI bus of PCI-DS bridge device 16.

PCI-DS bridge device 16 serves as a buffer for synchronizing bus cycles between internal PCI bus 2 and desk station bus 6. Also, PCI-DS bridge device 16 is also used as a mechanism for separating internal PCI bus 2 and desk station bus 6 when hot docking/hot undocking between the desk station and the computer main body. PCI-DS bridge device 16 can prevent the occurrence of deficiencies due to insertion and removal of hot lines.

PC card controller 17 serves as another PCI bus master on internal PCI bus 2 and controls PCI cards installed in the card slots 61 and 62.

DS-PCI/ISA bridge device 20 is a bridge LSI for connecting desk station bus 6, leading out to the desk station from the main body of the computer via the DS connector, to external PCI bus 4 and external ISA bus 5. DS-PCI/ISA bridge device 20 serves as a PCI master similar to PC card controller 17.

An external PCI bus bridge (EPBB) 201, an external ISA bus bridge (EIBB) 202, and a local bus arbiter (LBA) 203 are implemented in DS-PCI/ISA bridge device 20.

EPBB 201 receives through PCI-DS bridge device 16 transactions, such as memory cycles, I/O cycles generated on internal PCI bus 2, and sends them to external PCI bus 4. Also, where a bus access enable signal is granted to an external PCI expansion card installed in one of the expansion slots 41 and 42 on external PCI bus 4, EPBB 201 generates transactions on external PCI bus 4 in the desk station. External PCI bus 4, internal PCI bus 2 and desk station bus 6 are asynchronous, and their operating frequencies preferably are in the order of 33 MHz. Desk station bus 6 is the primary PCI bus of EPBB 201 and external PCI bus 4 is the secondary PCI bus of EPBB 201. EPBB 201 includes buffers for the synchronization of a bus cycle between internal PCI bus 2 and external PCI bus 4.

For instance, when a PCI expansion card executes a transaction to access a PCI device on internal PCI bus 2, EPBB 201 is capable of generating a dummy DEVSEL# in advance, without waiting for DEVSEL# from the target specified by the transaction, to prevent a master abort from occurring erroneously.

In addition, when EPBB 201 detects the generation of a master abort after the dummy DEVSEL# was driven, EPBB 201 is capable of completing the transaction of the PCI expansion card by a target abort.

EIBB 202 receives through PCI-DS bridge device 16 memory cycles and I/O cycles generated on internal PCI bus 2, protocol-converts them, and sends them to external ISA bus 5. Also, where a bus access enable signal is granted to an ISA master card on external ISA bus 5, EIBB 202 generates a transaction of an external ISA bus on desk station bus 6.

LBA 203 arbitrates bus access requests from the PCI expansion cards 41, 42 on external PCI bus 4 and bus access requests from ISA expansion cards 51, 52 on external ISA bus 5.

Figure 5:
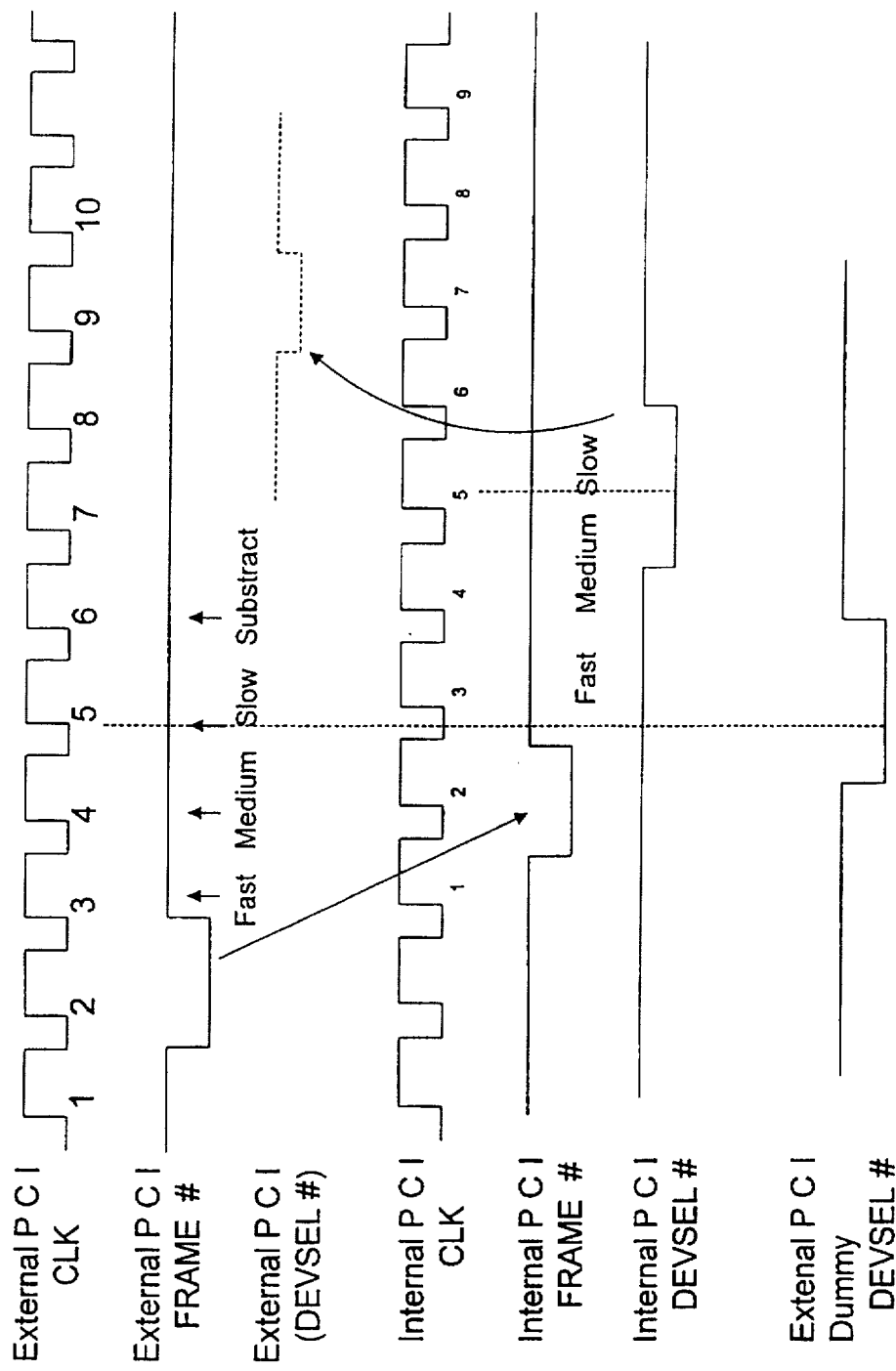
FIG. 5 is a timing chart showing the operation of the generation of a dummy DEVSEL# executed by a DS-PCI/ISA bridge device implemented in the computer system of FIG. 4.

FIG. 5 shows the timing of a dummy DEVSEL# generation function of EPBB 201.

For purposes of explanation, a delay caused by PCI-DS bridge device 16 is not considered. In this way, PCI-DS bridge device 16 and EPBB 201 are considered as one bridge. Thus, internal PCI bus 2 and external PCI bus 4 are treated as being connected through only one bridge.

To begin, a PCI expansion card on external PCI bus 4 begins an operation as a bus master, and commences a transaction to access a PCI device, for instance, host-PCI bridge device 12, PCI master 14 or PCI-ISA bridge device 15, on internal PCI bus 2 by activating a frame signal FRAME# at the rising edge of the clock cycle 2 on external PCI bus 4. This transaction is transmitted onto internal PCI bus 2 after a delay for the synchronization caused by EPBB 201, that is, EPBB 201 activates a FRAME# signal at the rising edge of the clock cycle ② on internal PCI bus 2.

The internal PCI device, which is a target, makes DEVSEL# active at the timing of the slow, that is, the CLK cycle ⑤ on internal PCI bus 2, according to a determined response timing. However, the response timing at which DEVSEL# on internal PCI bus 2 is transmitted into external PCI bus 4 is at the CLK cycle 9 on external PCI bus 4 due to the synchronization delay, as shown in FIG. 5. Thus, a master abort would occur conventionally.

To prevent this master abort, EPBB 201 pseudo-drives a dummy DEVSEL# signal on external PCI bus 4 active, according to the timing of the slow, that is, CLK cycle 5 on external PCI bus 4, without waiting for an actual DEVSEL# transmitted from internal PCI bus 2. The PCI expansion card, which began the transaction on external PCI bus 4, samples a DEVSEL# signal with the rising edge of the clock cycle 3, 4, 5, 6 on external PCI bus 4. Here, the PCI expansion card detects the generation of DEVSEL# at the rising edge of the CLK cycle 5. Thus, in the present invention, the generation of an erroneous master abort can be prevented.

After EPBB 201 generates the dummy DEVSEL# signal, EPBB 201 receives an actual DEVSEL# signal from internal PCI bus 2. However, EPBB 201 does not respond to the actual DEVSEL# signal transmitted from internal PCI bus 2 since the dummy DEVSEL# has already been generated.

Figure 6:
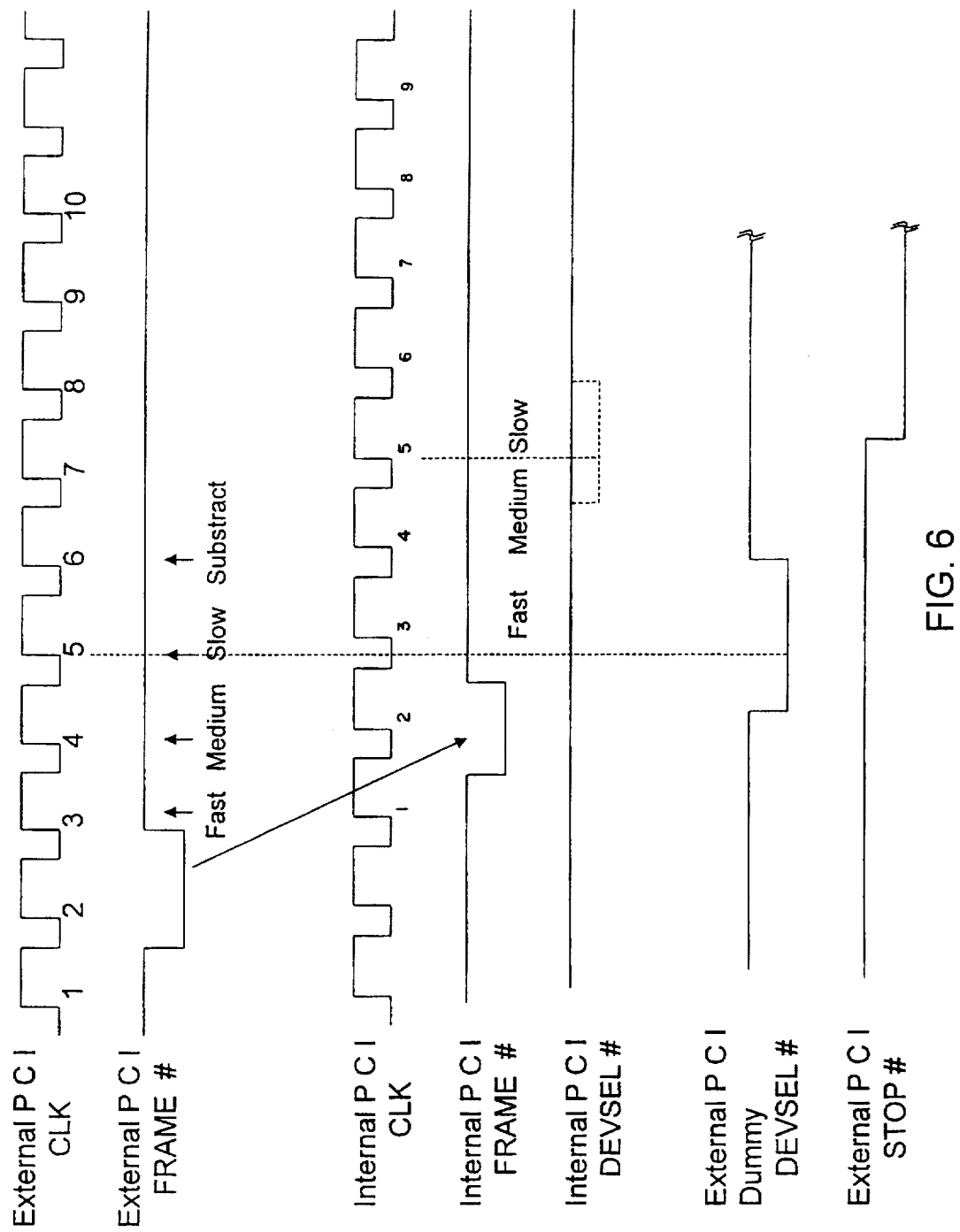
FIG. 6 is a timing chart showing the operation of the notification of a target abort executed by the DS-PCI/ISA bridge device implemented in the computer system of FIG. 4.

FIG. 6 shows the operation of EPBB 201 after the dummy DEVSEL# has been generated and when a master abort is actually generated.

After generating the dummy DEVSEL# signal, if EPBB 201 does not receive the actual DEVSEL# signal from internal PCI bus 2 within the predetermined period, that is, the master abort is actually generated, EPBB 201 activates a stop signal line STOP # on external PCI bus 4 at the rising edge of the clock cycle 8, to notify the PCI expansion card which began the transaction of the target abort. Thus, the transaction that was responded to in advance driving the device selection signal (DEVSEL#) can be terminated. Actually, even if the master abort is generated, the transaction can be normally completed.

Figure 7:
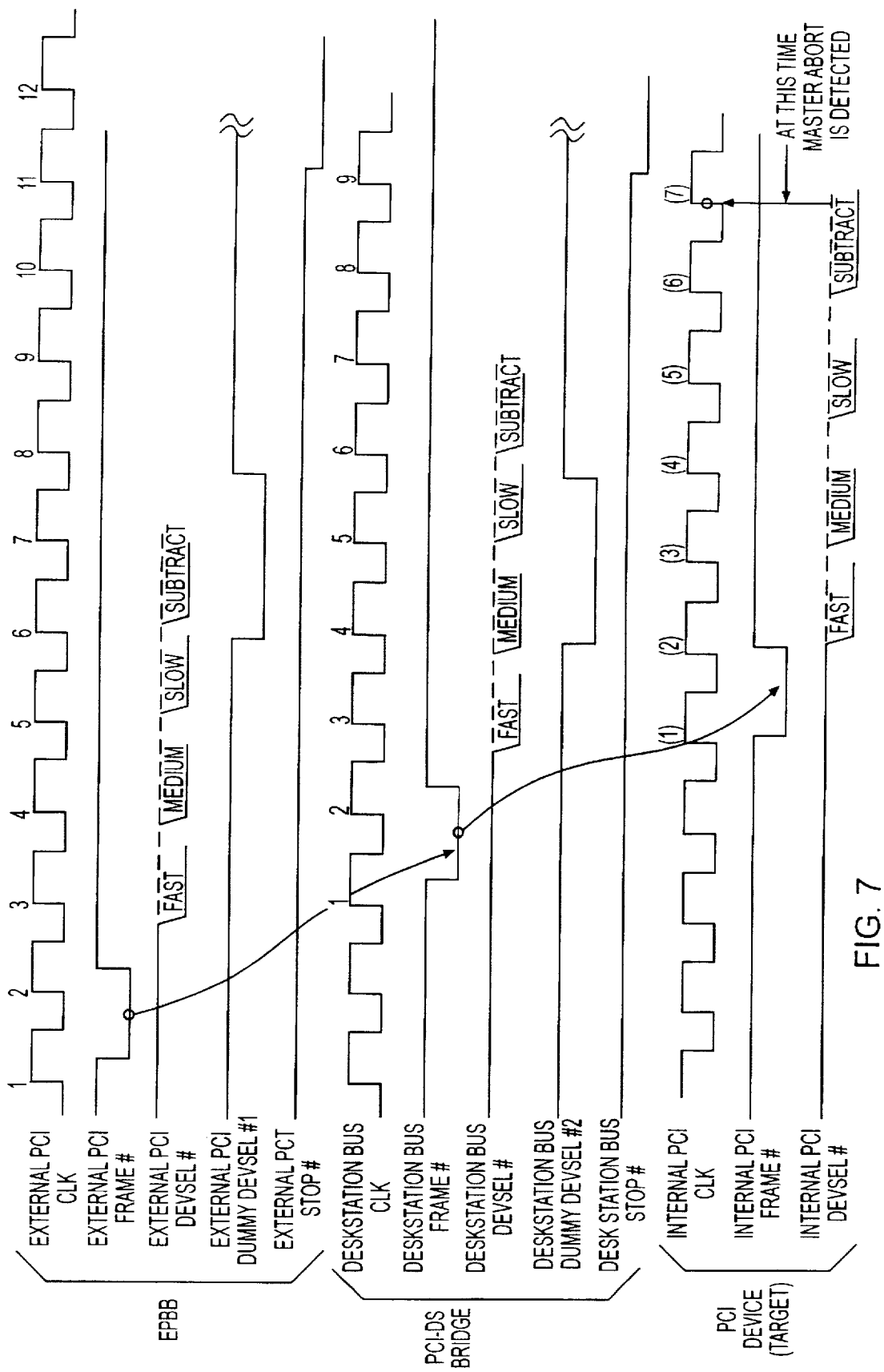
FIG. 7 is a timing chart showing the operation of the generation of dummy DEVSEL# signals executed by two bridges of a DS-PCI/ISA bridge device and a PCI-DS bridge device implemented in the computer system of FIG. 4.

Next, in consideration of the delays caused by both PCI-DS bridge device 16 and EPBB 201, the process of a dummy DEVSEL# generation is further explained, in reference to FIG. 7.

To begin, a PCI expansion card on external PCI bus 4 begins an ES operation as a bus master. The PCI expansion card asserts a frame signal FRAME# at the rising edge of the clock cycle 2 on external PCI bus 4, and commences a transaction to access a PCI device, for instance, host-PCI bridge 12, PCI master 14, or PCI-ISA bridge 15, on internal PCI bus 2. The PCI expansion card waits for a DEVSEL# signal on external PCI bus 4 to become active.

EPBB 201 activates a frame signal FRAME # at the rising edge of the clock cycle ② on desk station bus 6 and in advance outputs a dummy DEVSEL#1 signal at the rising edge of the clock cycle 6 on external PCI bus 4, and also waits for DEVSEL# on desk station bus 6 to be active.

Similarly, PCI-DS bridge device 16 outputs a dummy DEVSEL#2 signal at the rising edge of the clock cycle ⑥ on desk station bus 6 corresponding to a frame signal FRAME# on desk station bus 6 output by EPBB 201 and thereby responds to the transaction. In addition, PCI-DS bridge device 16 outputs a frame signal FRAME# at the rising edge of the clock cycle (2) on internal PCI bus 2 and waits for DEVSEL# on internal PCI bus 2 to be active.

If there is no target on internal PCI bus 2, PCI-DS bridge device 16 detects the generation of a master abort at the rising edge of the CLK cycle (6) on internal PCI bus 2. However, since PCI-DS bridge device 16 has already output dummy DEVSEL#2 signal on desk station bus 6, PCI-DS bridge device 16 does not notify EPBB 201 of the master abort. Similarly, the same thing also occurs between the PCI expansion card and EPBB 201 which outputs the dummy DEVSEL#1 signal on external PCI bus 4.

In this case as well as the case explained in FIG. 6, PCI-DS bridge device 16 activates a stop signal (STOP#) on desk station bus 6, and notifies a target abort to EPBB 201. Also EPBB 201 activates a stop signal (STOP#) on external PCI bus 4, and notifies the target abort to the PCI expansion card. In this way, the transaction is finished normally.

In the described embodiment of the present invention, a PCI device on external PCI bus 4 commences a transaction to access a PCI device on internal PCI bus 2. However, since the delays caused by the transmission and the synchronization of the transaction may be similarly generated between internal PCI bus 2 and processor bus 1, host-PCI bridge device 12 can also generate a dummy DEVSEL# signal and notify a target abort to an initiator as well as EPBB 201.

What is claimed is:

1. An apparatus for controlling a transaction, comprising:
   a first bus;
   a second bus;
   a first bridge device for transmitting a transaction between the first and second buses;
   a third bus;
   a second bridge device for transmitting a transaction between the second and third buses;
   wherein the second bridge device includes means for notifying a bus master connected to the third bus that a target specified by a transaction commenced by the bus master has decoded an address of the transaction commenced by the bus master, without waiting for an actual response from the target.

2. The apparatus of claim 1, wherein the target is connected to the first bus.

3. The apparatus of claim 1, wherein each of the first and second buses comprises a peripheral component interconnection bus.

4. The apparatus of claim 1, wherein the notifying means includes means for activating a device selection signal and transmitting the device selection signal to the bus master.

5. The apparatus of claim 4, wherein the activating means includes means for asserting the device selection signal within a predetermined time from when the bus master commences the transaction.

6. The apparatus of claim 5, wherein the second bus has an operation frequency different from the first bus.

7. The apparatus of claim 1, further comprising means, coupled to the first and second bridge devices, for monitoring whether a device selection signal assigned to the target has been activated.

8. The apparatus of claim 7, further comprising means, coupled to the first and second bridge devices, for notifying the bus master of a target abort, after the transaction was commenced, if the device selection signal connected to the target is not activated within a predetermined period from when the first bridge device commences the transaction of the bus master.

9. The apparatus of claim 8, wherein the notifying means includes means for activating a stop signal line assigned to the bus master to terminate the transaction.

10. A method of facilitating execution of a transaction by a target device, in a system comprising a first bus, a second bus, a third bus, a first bridge device connecting the first bus and the second bus, and a second bridge device connecting the second bus and the third bus, and a bus master connected to the third bus, comprising:

receiving, at the first bridge device from the second bridge device via the second bus, a transaction commenced by the bus master to access a target connected to the first bus;

transmitting, from the first bridge device, the transaction to the target;

notifying the bus master that the target has decoded the address of a transaction commenced by the bus master, without waiting for an actual response from the target.

11. The method according to claim 10, further comprising:

receiving, at the first bridge device, a response indicating that the target device recognizes the transaction; and transmitting, from the first bridge device to the second bus, a response indicating that the target device recognizes the transaction, after the first bridge device received the response on the first bus.

12. The method according to claim 10, further comprising:

receiving, at the first bus, a device selection signal indicating recognition of the transaction by the target device; and transmitting, from the first bridge device to the second bus, a device selection signal indicating recognition of the transaction by the target device after a predetermined time from when the first bridge device received the transaction.

13. The method according to claim 10, further comprising:

transmitting, from the second bridge device to the third bus, a target abort signal indicating that the requested transaction should be aborted, if the first bridge device does not receive a response from the target device within a predetermined time from when the first bridge device received the transaction.

14. A computer system for controlling a transaction on a PCI bus, comprising:

a computer main body; and an extended unit, detachably connected to the computer main body through an extended connector, for installing expansion card devices therein, wherein the computer main body includes;

a first PCI bus;

a second PCI bus, coupled to the extended unit through the extended connector; and a first bridge device for transmitting a transaction between the first and second PCI buses, wherein the extended unit includes;

a third PCI bus for connecting PCI expansion devices; and a second bridge device for transmitting a transaction between the second and third PCI buses;

wherein the second bridge device includes means for, when a bus master on the third PCI bus commences a transaction to access a target on the first PCI bus, activating a device selection signal line on the third bus, without waiting for a response from the target.

15. The computer system of claim 14, wherein the first PCI bus and the second PCI bus are asynchronous.

16. The computer system of claim 15, wherein the first PCI bus and the third PCI bus are asynchronous.

17. The computer system of claim 14, wherein the second bridge device includes means for driving a stop signal line on the third PCI bus to notify the bus master of a target abort, if a device selection signal line connected to the target is not activated within a predetermined period after the transaction was commenced.

* * * * *